United States Patent [19]

Meyer et al.

[11] Patent Number: 5,047,871
[45] Date of Patent: Sep. 10, 1991

[54] DIRECTION SCALING METHOD AND APPARATUS FOR IMAGE SCANNING RESOLUTION CONTROL

[75] Inventors: Gerald L. Meyer, Loveland; David W. Boyd, Greeley, both of Colo.

[73] Assignee: Hewlett-Packard Company, Palo Alto, Calif.

[21] Appl. No.: 356,027

[22] Filed: May 23, 1989

[51] Int. Cl.⁵ .................... H04N 1/04; H04N 1/10
[52] U.S. Cl. .................... 358/486; 358/474; 358/494
[58] Field of Search ............ 358/448, 455, 474, 480, 358/486, 491, 497, 456

[56] References Cited

U.S. PATENT DOCUMENTS

| | | | |
|---|---|---|---|
| 3,670,099 | 6/1972 | Oliver | 358/486 |
| 3,919,464 | 11/1975 | Kondoh | 358/486 |
| 4,190,867 | 2/1980 | Ohnishi | 358/486 |
| 4,367,493 | 1/1983 | Matterson | 358/486 |
| 4,394,693 | 7/1983 | Shirley | 358/455 |
| 4,591,727 | 5/1986 | Gaebeleir et al. | |
| 4,704,637 | 11/1987 | Mizumo | 358/466 |
| 4,748,514 | 5/1988 | Bell | |
| 4,922,351 | 5/1990 | Suzuki et al. | 358/480 |

*Primary Examiner*—Howard W. Britton
*Assistant Examiner*—Kim Yen Vu

[57] ABSTRACT

The density of pixel samples across a document is determined by employing a constant scanner sensing head sampling rate and driving the scanner head movement at a rate directly correlated to the preselected density level. The scanner operator determines the particular density and introduces a signal to motor drive controls to cause it to move across the image at the preselected rate.

7 Claims, 2 Drawing Sheets

DIRECTION SCALING METHOD AND APPARATUS FOR IMAGE SCANNING RESOLUTION CONTROL

TECHNICAL FIELD

The present invention relates to methods and apparatus for scanning images contained on planar media and producing output signals correlated to light reflected from such images. More particularly, the present invention relates to image scanners which employ an array of light sensitive elements mounted in a scanning head for movement across a plane generally parallel to the image plane for producing a series of output signals correlated to the image on the media.

BACKGROUND OF THE INVENTION

Contemporary image scanners typically are configured to produce relative motion between an array of light sensitive elements mounted in a scanning head and the image that is intended to have its contents converted to output signals manageable by data processing. That is, some such scanners sometimes move the image relative to the array while others move the array relative to the image and still others move both the image and the array. Generally, such scanners employ drive motors for moving a carriage that contains the scanning head with the motor intended to cause the scanning to occur at a relatively constant speed. Some systems will employ scanner sampling that is physically controlled by the position of the scanning head so that the sample is relatively independent of the scanner movement thereby producing a relatively constant image scanning rate or pixel density against the image under consideration.

Some prior art systems recognize that the drive motor for the scanner carriage may have variations in speed and attempt to control the sampling rate so that it is correlated to the particular scanning motor speed at a given time. One example of this is shown in U.S. Pat. No. 4,591,727 by Gaebelein et al.

In yet another form of scanner, the potential overloading of the output buffer by failure of the receiving position or workstation or the like is shown in U.S. Pat. No. 4,478,514 by Bell. In this case, the speed of the drive motor for the scanner is actually correlated directly to the amount of remaining storage space in the output buffer for the scanner. Thus, if the relative pixel density is to have uniformity across the image scanning, it is also necessary to correlate the scanner sampling rate in such an apparatus with the particular velocity of the scanner motor at any given moment.

None of the known prior art devices allow the correlation of the speed of scanning in direct relation to a predetermined pixel density so that constant scanner head sampling is possible.

DISCLOSURE OF THE INVENTION

The present invention is an apparatus and process for allowing the system user to preselect the desired resolution of pixel density in a scanner device. Image sensing elements mechanically traverse a document to sense the average level of the reflective light. The light exposure time is kept constant for a high number of pixels per inch by moving the sensor at a relatively slow rate. For lower numbers of pixels per inch, the sensor is moved at a higher speed rate. By having control over the sensor speed, the desired resolution and pixels per inch is achieved.

The apparatus and environment of the present invention for scaling image data sensed from a planar media includes a device wherein the image on the media is scanned by a scanner head which has an array of elements each capable of detecting the level of light reflected from the media image at a particular spot under consideration. The elements are retained in the head in a generally elongated linear configuration and the head is mounted for movement through a plane parallel to the media image plane so that light from a source illuminating the media image is reflected into the array of elements.

The invention includes an arrangement for generating a signal which reflects a predetermined pixel sampling density that the user selects. The scanner head is moved through the plane parallel to the media image plane, and this moving apparatus is responsive to the pixel sampling density related signal that is generated for moving the scanner head at a rate that is directly correlated to this predetermined and preselected pixel sampling density.

Using the structure of this invention, it is possible to include a constant rate sampling means for sampling the elements of the scanner head as it moves through the plane parallel to the media image.

Considered as a process, the present invention for scanning an image that is present on a planar media uses the scanning heads which are generally in a linear array of discreet light sensor elements positioned to detect light reflected from the media. The elements of the array are sampled at a substantially constant rate while the present invention contemplates the positioning of the light sensor array in an initial location over the media image in proximity to an edge of the media.

The user determines the image scaling density as a function of the number of pixels per geometric unit of image that is required for recording. The light sensor array is thus moved across the image from the initial location image edge at a rate correlated to this predetermined image scaling density.

Thus, in accordance with the present invention, scaling is accomplished to allow arbitrarily excellent accuracy of data scanned. It is possible to scan at faster rates for lower resolutions at the users option. Further, no significant or important portion of the image is discarded and no expensive electronic hardware averaging is required. Still further, it is not necessary to employ relatively slow software averaging to produce the desired result.

Those having normal skill in the art will recognize the foregoing and other objects, features, advantages and applications of the present invention from the following more detailed description of the preferred embodiments as illustrated in the accompanying drawings.

DETAILED DESCRIPTION OF THE PREFERRED EMBODIMENTS

Figure 1:
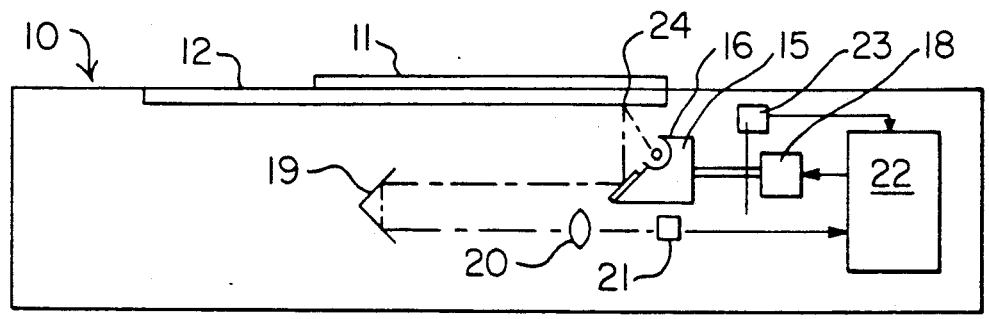
FIG. 1 is a somewhat schematic side view of a typical scanner environment in which the present invention is potentially implemented.
Figure 2:
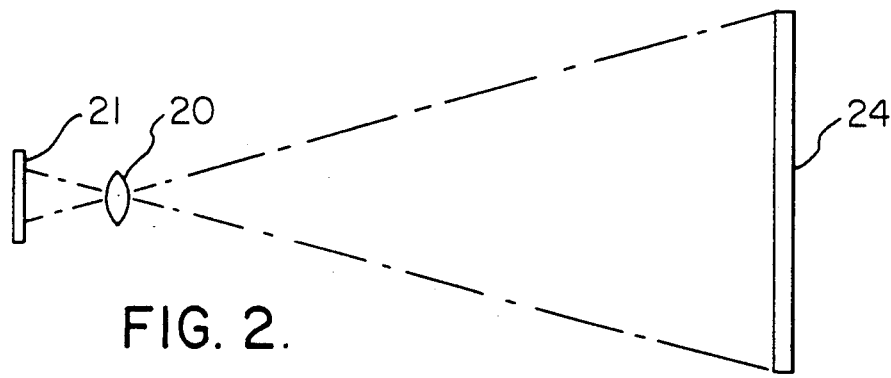
FIG. 2 is a top view of the linear line scan relationship between the image and the photosensitive sensor array.
Figure 3:
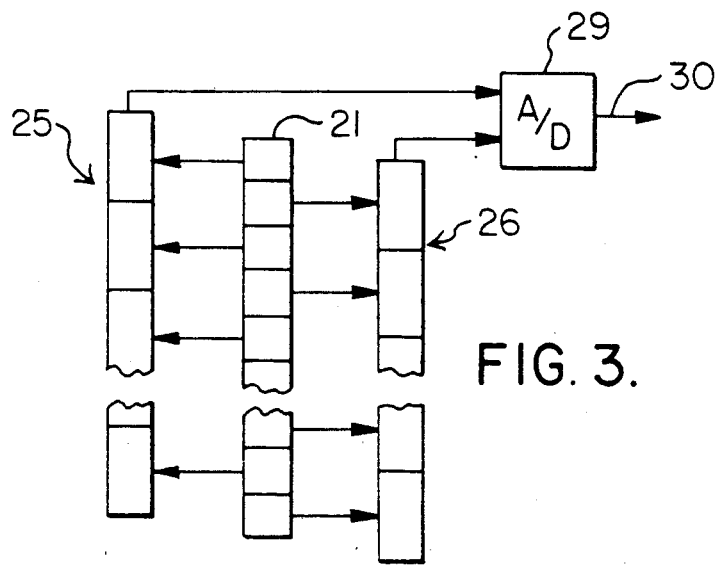
FIG. 3 is a diagram of the circuitry for sampling the contents of the sensor array in the scanner head and for producing a digital output after converting those samples from their analog conditions.

A typical machine environment for implementing the present invention is shown in FIGS. 1-3 in the form of scanner 10. In this example, document 11 is positioned with one side facing downwards on transparent platen 12 for scanning so as to convert the visual images contained thereon into an electronic image form that is useable by data processing machines.

The scanning is accomplished by movable carriage 15 which contains a linear light source 16 and a reflecting mirror 17. Motor 18 is mechanically coupled to carriage 15 as by gears, cables or the like, to move carriage 15 along the length of platen 12. The reflected light is redirected by movable corner mirror 19 into lens 20 and thence into sensor 21.

As is well known in the art, mirror 19 is mounted for movement concurrently with carriage 15 but at one half the velocity of carriage 15 so that the optical path from scan line 24 to sensor 21 is maintained constant in length. Sensor 21 is preferably a charge coupled device (CCD) configured as a linear serial array of discrete detector elements or cells. For instance, CCD's which can distinguish 300 of these cells per inch on the document provide good quality resolution, and are readily available from contemporary commercial sources.

In FIG. 2, the typical 8.5 inch image scan line 24 (note FIG. 1) is reduced as it passes through lens 20 in a ratio of 7.5:1 before reaching the CCD 21 detector array. The electrical signal content of sensor 21 is periodically read out as carriage 15 moves along the length of document 11 on platen 12. Thus, if sensor 21 is configured with 2250 sensors per inch, it is possible with appropriate controls to record image densities of 300×300 detected pixel elements per square inch from the document.

The output of CCD 21 is coupled to electronic controller 22 where it is converted as described below in conjunction with FIG. 3. Controller 22 introduces drive signals to motor 18 and may also receive position or movement feedback information relative to carriage 15 such as from the output of a tachometer detector arrangement 23.

FIG. 3 illustrates one arrangement for reading out the contents of sensor 21. By gating signal controls not shown, the contents of every other detector cell of sensor 21 is coupled in parallel into analog shift register 25 while the signals present in the other, intervening cells are coupled in parallel into analog shift register 26. That is, in the example shown, the contents of the odd numbered cells of sensor 21 are periodically transferred to shift register 25 whereas the even numbered cells have their contents transferred to shift register 26 at the same time.

The signals loaded into registers 25 and 26 are analog signals representative of various reflected light levels. Their electrical magnitude corresponds to the average of the light reflected from a small increment of the surface of document 11 over a predetermined period of time. Subsequent to transfer into registers 25 and 26, these signals are shifted serially into an analog to digital converter (A/D) 29. A variety of appropriate analog to digital converters are commercially available for this purpose. The output 30 of A/D 29 is a sequence of bytes of data. Each of those bytes is encoded so as to correspond digitally to the magnitude of a discrete one of the analog signals retrieved from shift registers 25 and 26, and thus each byte corresponds to the magnitude of reflected light present at one of the cells of array 21. That is, if array 21 images 300 cells per inch, output 30 of A/D 29 comprises a similar 300 bytes per inch.

Scan line 24 typically represents the width or length of the document for which scanning is occurring. Assuming scan line 24 is the narrower or 8.5 inch dimension and this is referenced as the x-dimension, the scan control of the present invention relates to maintaining the particular velocity in the y-direction so as to determine the y-direction scaling and pixel density in general.

Figure 4:
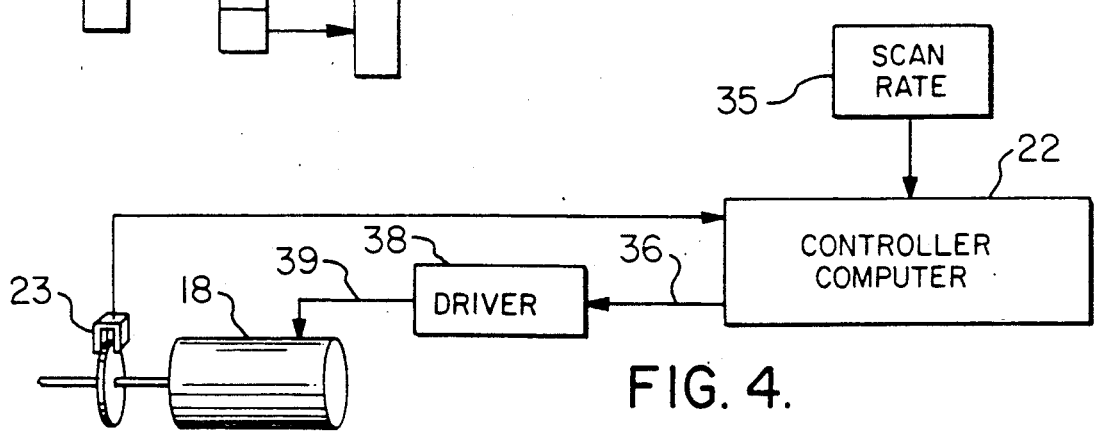
FIG. 4 is a circuit diagram showing the relationship of the apparatus elements associated with the present invention.

The elements of FIG. 1 relating to the present invention are shown somewhat schematically in FIG. 4. The user determines the intended y-direction scan rate and enters this via input device 35. This scan rate is represented by a digital quantity and originates from a keyboard, host computer, communication link or the like. The digital scan rate code is stored in the controller computer 22 and used to provide an enabling signal 36 to motor driver circuit 38 and thence to the drive motor 18. If drive motor 18 is a stepper motor for example, the timing between drive pulses produced over line 36 over driver 38 and into line 39 has those pulses timed appropriately for causing the carriage 15 to move with a velocity correlated to the scan rate data entered through input device 35. This is described in somewhat greater detail below in conjunction with FIGS. 5 and 6.

Tachometer 23 generates feedback signals to controller computer 22 so that appropriate corrective action is available to computer 22 to insure that the drive signals appearing over line 36 compensate for any shift in velocity necessary to maintain the desired scanning velocity. Thus, the speed of the scanner is adjusted while maintaining the sampling rate constant to produce uniform y-direction scaling. That is, the sampling rate for taking samples of light levels contained in CCD 21 is maintained constant and those samples are gated into analog shift registers 25 and 26 at a predetermined constant rate. Therefore, the actual pixel density and, as a result, the resolution of the scanned image is controlled directly by this y-direction velocity control.

Figure 5:
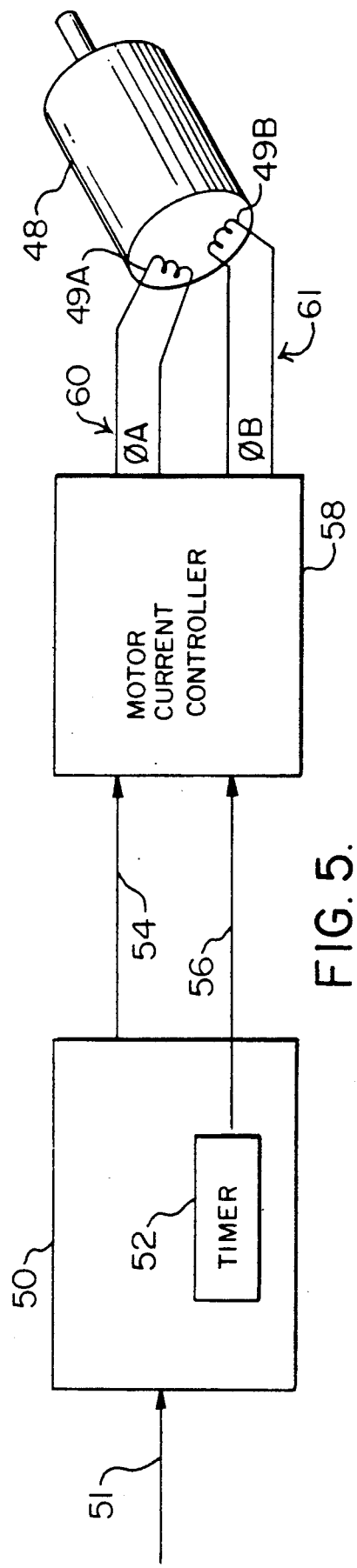
FIG. 5 is a circuit diagram of another implementation of the present invention using a stepper motor.

FIG. 5 illustrates an embodiment wherein the present invention is implemented using a stepper motor. In contrast to FIG. 4, the FIG. 5 embodiment does not require the use of a tachometer. As discussed above, the image sensor carriage 15 is moved underneath the paper or other object on the glass platen 12 such as by a cable and pulley arrangement with stepper motor 48. As is known to those skilled in the art, stepper motors are driven by sequentially energizing two drive windings with electrical currents that are 90° out of phase with one another. The direction of rotation is a function of the leading and lagging relationships of the winding phase currents.

Figure 6:
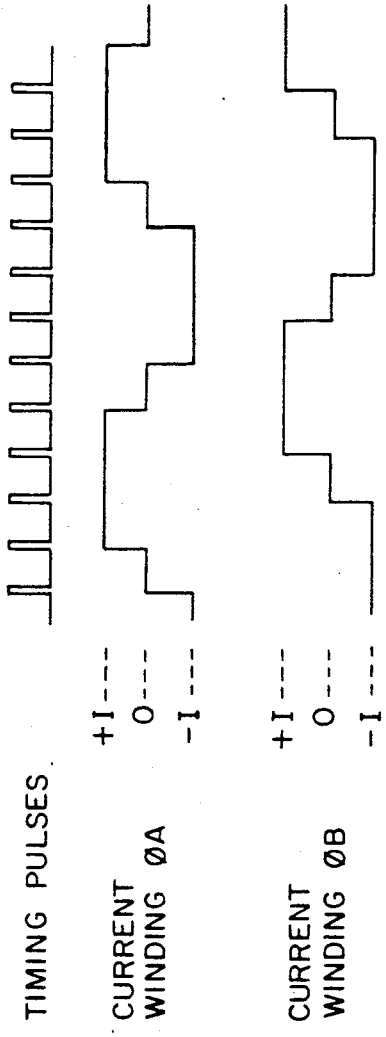
FIG. 6 is a time base diagram of the controlling waveforms associated with FIG. 5.

Each of the two windings 49A and 49B are digitally driven such that there is either positive current, no current or negative current flowing through it. As each of the drive current states is sequenced, the shaft 46 rotates a specific amount in the desired direction. The Y-scale command is introduced to microprocessor 50 over input 51. In response, a motor direction indicating signal 54 directs clockwise or counterclockwise motor motion while the state incrementing timing pulses are produced at output 56. The relationships of typical such outputs from microprocessor 50 are shown in FIG. 6.

There are industry standard integrated circuits available for implementation of the controller 58 functions. An example is the L297 and L298 pair manufactured by SGS. The L297 is a state sequencer and current controller whereas the L298 is a current amplifier which directly drives the motor. The L297/L298 combination is fed sequential pulses each of which advance the motor driving current state. The shaft and pulley diameters are sized such that each state which is advanced (commonly called a half-step) in a typical example moves the carriage one four hundredth of an inch.

The speed of the carriage 15 is settable by establishing the period or rate of the state sequencing of current to motor 48. State sequencing is controlled by timer 52 in microprocessor 50. A Motorola 68B03 is suitable for the timer 52 and microprocessor 50 implementation. The timer period is commanded by the microprocessor 50 code consistent with the desired speed.

As an example, in a scanner the exposure time of the CCD 21 may remain constant at 5.0 milliseconds per exposure line. If it is desired to have a Y-scale factor of 160 exposure lines per inch, the carriage moves at 5 milliseconds per line times 160 lines per inch or 0.8 seconds per inch. As stated previously, the mechanical design determines that each motor state advance moves the carriage 15 1/300th of an inch so this would require the motor winding current to change state every 2.67 milliseconds.

While the exemplary preferred embodiments of the present invention are described herein with particularity, those having normal skill in the art will recognize various changes, modifications, additions and applications other than those specifically mentioned herein without departing from the spirit of this invention.

What is claimed is:

1. Apparatus for scaling image data sensed from a planar media which contains the image using a scanner head having an array of elements each capable of detecting the level of light reflected from the media image with the elements retained in the scanner head in a generally elongated liner configuration and an actuator for producing relative movement of a line of scanning light with respect to the media image plane so that light from a source illuminating the media image is reflected into the array elements comprising
    means generating a signal reflecting a predetermined pixel sampling density,
    enabling means having an input and including means responsive to signals present at said enabling means input for enabling the relative movement producing actuator to cause relative motion of the line of scanning light with respect to the media image plane at a rate corresponding to signals present to said enabling means input, and
    means coupling said generating means signal to said enabling means input for causing said relative movement producing actuator to establish relative movement between the media image and the line of scanning light at a rate correlated to a predetermined pixel density.

2. Apparatus in accordance with claim 1 which further includes means for sampling the scanner head elements at a constant rate as said actuator causes the relative movement between the scanning light line and the media image plane.

3. Apparatus in accordance with claim 2 wherein said actuator means includes a stepper motor, said signal generating means includes means for producing digital pulses recurring at a rate corresponding to said pixel sampling density signal for energizing said stepper motor, and said stepper motor responding to said digital pulses from said enabling means for producing scanning relative motion at said constant rate.

4. Apparatus in accordance with claim 1 wherein said actuator includes a drive motor for moving the line of scanning light, and said signal generating means includes microprocessor means coupled for receiving said signal corresponding to said predetermined pixel sampling density, said microprocessor means converting said sampling density signal to an output signal for coupling to energize said motor for energizing it to move the scanning light line at said pixel density correlated rate.

5. Apparatus in accordance with claim 4 wherein said drive motor is a stepper motor, and said microprocessor means output is a stream of pulses recurring at a rate corresponding to said predetermined pixel density sampling rate.

6. A process for scanning an image present on a planar media using a scanning head having a generally linear array of discrete light sensor elements positioned to detect light reflected from relative movement between a line of light and the media comprising the steps of
    positioning the line of light with respect to the image contained on the planar media image in proximity to the location of an initial edge of that image,
    determining the image scaling density as a function of the number of pixels per geometric unit of the image for recording,
    moving the line of light across the image from said initial image edge location at a substantially fixed rate correlated to said determining step, and
    sampling the output of the light sensor array elements at a constant rate.

7. A process in accordance with claim 6 which includes a stepper motor for moving the line of light, said determining step further including the step of producing a stream of digital pulses recurring at a rate corresponding to said determined image scaling density, and said moving step includes the step of introducing the digital pulse stream for actuating the stepper motor.

* * * * *

EX PARTE REEXAMINATION CERTIFICATE (4889th)

United States Patent
Meyer et al.

(10) Number: US 5,047,871 C1
(45) Certificate Issued: Jan. 6, 2004

(54) DIRECTION SCALING METHOD AND APPARATUS FOR IMAGE SCANNING RESOLUTION CONTROL

(75) Inventors: Gerald L. Meyer, Loveland, CO (US); David W. Boyd, Greeley, CO (US)

(73) Assignee: Hewlett-Packard Company, Fort Collins, CO (US)

Reexamination Request:
No. 90/006,159, Dec. 7, 2001

Reexamination Certificate for:
Patent No.: 5,047,871
Issued: Sep. 10, 1991
Appl. No.: 07/356,027
Filed: May 23, 1989

(51) Int. Cl.$^7$ .............................. H04N 1/04; H04N 1/10
(52) U.S. Cl. ..................... 358/486; 358/474; 358/494
(58) Field of Search ..................... 358/445, 497, 358/486, 412, 474, 496, 451; 355/55; 250/208.1, 234–236

(56) References Cited

U.S. PATENT DOCUMENTS

| | | | |
|---|---|---|---|
| 4,367,493 A | 1/1983 | Matteson | 358/496 |
| 4,587,621 A | 5/1986 | DuVall | 355/55 |
| 4,651,221 A | 3/1987 | Yamaguchi | 358/444 |
| 4,691,114 A | 9/1987 | Hasegawa et al. | 358/474 |
| 4,712,142 A | 12/1987 | Tomita et al. | 358/468 |

OTHER PUBLICATIONS

Inoue, H. et al., "High–Speed Image Scanner", Journal of Imaging Technology, Oct. 1985, pp. 210–214.

"Boise Presentation—Week of Sep. 8, 1986", 4 pg.

Author Unknown, "HP Scanner Specifications", date unknown, 2 pg.

*Primary Examiner*—Cheukfan Lee

(57) ABSTRACT

The density of pixel samples across a document is determined by employing a constant scanner sensing head sampling rate and driving the scanner head movement at a rate directly correlated to the preselected density level. The scanner operator determines the particular density and introduces a signal to motor drive controls to cause it to move across the image at the preselected rate.

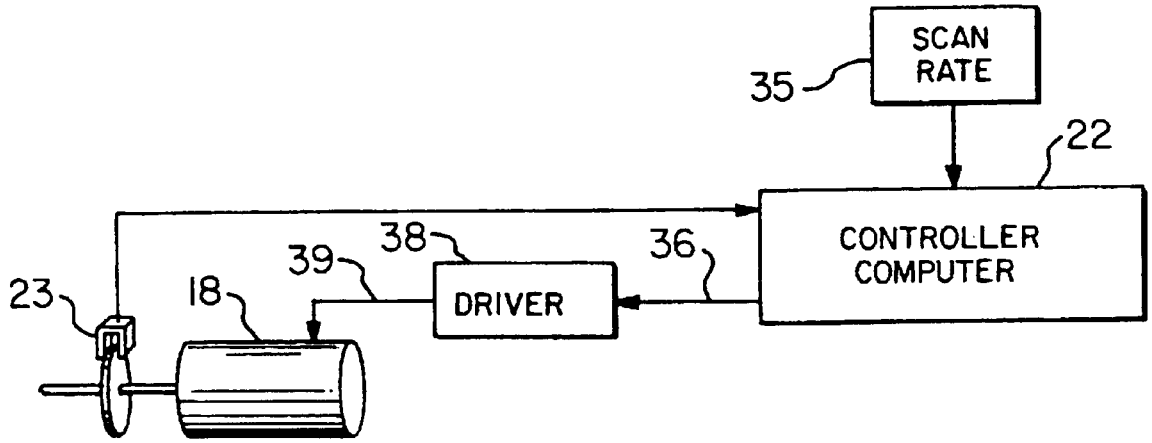

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 6 are determined to be patenable as amended.

Claims 2–5 and 7, dependent on an amended claim, are determined to be patentable.

1. Apparatus for scaling image data sensed from a planer media which contains the image using a scanner head having an array of elements each capable of detecting the level of light reflected from the media image with the elements retained in the scanner head in a generally elongated liner configuration and an actuator for producing relative movement of a line of scanning light with respect to the media image plane so that light from a source illuminating the media image is reflected into the array elements, *the apparatus* comprising*:* means generating a signal reflecting a predetermined pixel sampling density *within a range of predetermined pixel sampling densities, the range of predetermined pixel sampling densities being all selectable pixel sample densities from a low pixel sample density to a high pixel sample density and including a plurality of pixel sampling densities therebetween*, enabling means having an input and including means responsive to signals present at said enabling means input for enabling the relative movement producing actuator to cause relative motion of the line scanning light with respect to the media image plane at a rate corresponding to signals present to said enabling means input, and means coupling said generating means signal to said enabling means input for causing said relative movement producing actuator to establish relative movement between the media image and the line of scanning light at a *substantially fixed* rate correlated to a predetermined pixel density, *where each said substantially fixed rate is separately correlated to each pixel sample density within the range of predetermined pixel sampling densities*.

6. A process for scanning an image present on a planar media using a scanning head having a generally linear array of discrete light sensor elements positioned to detect light reflected from relative movement between a line of light and the media, *the process* comprising the steps of*:* positioning the line of light with respect to the image contained on the planar media image in proximity to the location of an initial edge of that image, determining the image scaling density *within a range of predetermined image scaling densities* as a function of the number of pixels per geometric unit of the image for recording, *the range of predetermined image scaling densities being all selectable image scaling densities from a low image scaling density to a high image scaling density an including a plurality of image scaling densities therebetween*, moving the line of light across the image from said initial image edge location at a substantially fixed rate correlated to said determining step, *where each said substantially fixed rate is separately correlated to each image scaling density within the range of image scaling densities*, and sampling an output of the light sensor array elements at a constant rate.

* * * * *